United States Patent

Gallucci et al.

[11] Patent Number: 5,326,793

[45] Date of Patent: * Jul. 5, 1994

[54] GLASS FIBER REINFORCED POLYCARBONATE/POLYESTER BLENDS

[75] Inventors: Robert R. Gallucci, Mt. Vernon, Ind.; Kelvin T. Okamoto, Wilmington, Del.

[73] Assignee: General Electric Company, Pittsfield, Mass.

[*] Notice: The portion of the term of this patent subsequent to Feb. 5, 2008 has been disclaimed.

[21] Appl. No.: 565,850

[22] Filed: Aug. 10, 1990

Related U.S. Application Data

[63] Continuation-in-part of Ser. No. 523,162, May 14, 1990, abandoned.

[51] Int. Cl.⁵ .............................................. C08J 8/32
[52] U.S. Cl. ................................... 523/217; 524/101; 524/537; 524/484
[58] Field of Search ................. 523/217; 524/537, 101, 524/484

[56] References Cited

U.S. PATENT DOCUMENTS

| | | | |
|---|---|---|---|
| 2,465,319 | 3/1949 | Whinfield et al. | 260/75 |
| 3,047,539 | 7/1962 | Pengilly | 260/75 |
| 3,368,995 | 2/1968 | Furukawa et al. | 260/40 |
| 3,671,487 | 6/1972 | Abolins | 106/15 |
| 3,814,725 | 6/1974 | Zimmerman et al. | 260/40 R |
| 3,962,174 | 6/1976 | Berardinelli | 260/40 R |
| 4,113,692 | 9/1978 | Wambach | 260/40 R |
| 4,124,561 | 11/1978 | Phipps, Jr. et al. | 260/40 R |
| 4,184,997 | 1/1980 | Wu | 525/421 |
| 4,276,208 | 6/1981 | Ogawa et al. | 260/28 R |
| 4,394,475 | 7/1983 | Temple et al. | 524/262 |
| 4,487,797 | 12/1984 | Watson | 428/268 |
| 4,539,350 | 9/1985 | Abeleen et al. | 523/527 |
| 4,568,712 | 2/1986 | Van Abeleen et al. | 524/267 |
| 4,711,924 | 12/1987 | Salensky | 524/402 |
| 4,745,028 | 5/1988 | Das et al. | 428/391 |
| 4,990,549 | 2/1991 | Delvin et al. | 523/209 |

FOREIGN PATENT DOCUMENTS

| | | |
|---|---|---|
| 7360144 | of 1973 | Japan . |
| 7994556 | of 1978 | Japan . |
| 039048 | of 1989 | Japan . |
| 1592205 | of 0000 | United Kingdom . |
| 1592668 | of 0000 | United Kingdom . |

OTHER PUBLICATIONS

Abraimova et al., Chemical Abstracts, No. 136,892, p. 22, vol. 81, 1974.

Primary Examiner—Paul R. Michl
Assistant Examiner—Edward J. Cain
Attorney, Agent, or Firm—Andrew C. Hess

[57] ABSTRACT

The tensile strength and flexural strength of glass fiber reinforced aromatic polycarbonate resin/poly(butylene terephthalate) resin blends is improved by employing a glass fiber reinforcing agent treated with a sizing agent selected from epoxy functional cyanurates and isocyanurates. The reinforced blends are useful for making molded articles.

6 Claims, No Drawings

GLASS FIBER REINFORCED POLYCARBONATE/POLYESTER BLENDS

This is a continuation-in-part of application Ser. No. 523,162 filed on May 14, 1990, abandoned.

BACKGROUND OF THE INVENTION

1. Field of the Invention

The present invention relates to glass fiber reinforced blends of polycarbonate resin/polyester resin, and more particularly relates to thermoplastic compositions containing (a) an aromatic polycarbonate resin, (b) a polyester resin, and (c) a glass fiber reinforcing agent treated with an epoxy functionalized cyanurate or isocyanurate sizing agent.

2. Description of Related Art

Polyester-polycarbonate blends having increased melt viscosity containing a poly (O- or N-epoxy alkyl substituted) cyclic amide, imide, or imidate such as triglycidyl isocyanurate are set out in U.S. Pat. No. 4,788,251. However, the reference does not teach using the triglycidyl isocyanurate as a glass sizing agent to improve the flexural and impact strengths of reinforced blends of aromatic polycarbonate/polyester.

Glass fiber reinforced blends of polyester resins with polycarbonate resins are known, see for example, Kawase, et. al., U.S. Pat. No. 3,953,539 and Wambach, U.S. Pat. No. 4,113,692. While these reinforced blends exhibit useful properties, it is desired to improve the impact strength and flexural strength of such reinforced blends.

Accordingly, an object of the present invention is to provide fiber reinforced blends of polyester resins with polycarbonate resins exhibiting enhanced levels of physical properties such as tensile, flexural and impact strength.

SUMMARY OF THE INVENTION

The present invention involves thermoplastic resin compositions containing (a) an aromatic polycarbonate resin, (b) a polyester resin, and (c) a glass fiber reinforcing agent treated with a sizing agent selected from the group consisting of functionalized cyanurates or isocyanurates. The glass fiber having the cyanurate or isocyanurate functional sizing agent provides fiber reinforced compositions exhibiting enhanced physical properties.

DETAILED DESCRIPTION OF THE INVENTION

The polyester resins of the compositions of this invention are available commercially or can be prepared by known techniques such as by the alcoholysis of esters of terephthalic acid with ethylene glycol or butane diol and subsequent polymerization, by heating the glycols with the free acids or with halide derivatives thereof, and similar processes. These are described in U.S. Pat. Nos. 2,465,319 and 3,047,539, and elsewhere. Preferred polyesters are crystalline, having a distinct melting point.

The higher molecular weight linear polyesters are polymeric glycol esters of terephthalic acid and isophthalic acids. They can be prepared by known techniques such as by the alcoholysis of esters of the phthalic acid with a glycol and subsequent polymerization, by heating glycols with the free acids or with halide derivatives thereof, and similar processes. These are described in U.S. Pat. Nos. 2,465,319 and 3,047,539, and elsewhere. In addition to the phthalates, amounts, e.g., from 0.5% to 15% by weight, of other aromatic dicarboxylic acids, such as naphthalene dicarboxylic acid, can be present in the polyester component. Although the term "linear" is used, the reactants can also include amounts of tri- or polyfunctional branching agents, such as trimethylolpropane, pantaerythritol, trimethyl trimesate, trimethyl trimellitate.

Preferred polyesters will be of the family consisting of high molecular weight, polymeric glycol terephthalates or isophthalates having repeating units of the general formula:

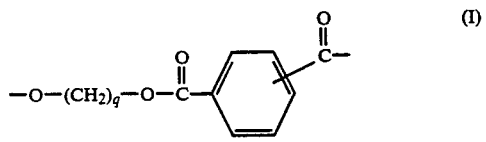

wherein q is a whole number of from 2 to 10, preferably from 2 to 4, and mixtures of such esters, including copolyesters of terephthalic and isophthalic acids of up to about 30 mole % isophthalic units.

Especially preferred polyesters are poly(ethylene terephthalate), polycyclohexane dimethanol terephthalate and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, after completion of the reaction, the high molecular weight polyesters will have an intrinsic viscosity of about 0.6 to 2.0 dl./g. and preferably, from 0.7 to 1.6 dl./g., as measured, for example, in a 60:40 phenol-tetrachloroethane mixture at 30° C.

Polycarbonates suitable for use in the present invention are any of those known in the art. Especially preferred polycarbonates are the aromatic polycarbonates. Aromatic polycarbonates useful herein are homopolymers, copolymers, and mixtures thereof, which have an intrinsic viscosity of from about 0.3 to about 1.0 dl/g as measured in methylene chloride at 25° C. These polycarbonates are derived from dihydric phenols such as, for example, 2,2-bis(4-hydroxyphenyl)propane; bis(4-hydroxyphenyl)methane; 2,2-bis(4-hydroxy-3-methylphenyl)propane; 4,4-bis(4-hydroxyphenyl)heptane; 2,2-(3,5,3',5'-tetrachloro-4,4'-dihydroxyphenyl)propane; and (3,3'-dichloro-4,4'-dihydroxyphenyl)methane. Other dihydric phenols which are also suitable for use in the preparation of the above polycarbonates are disclosed in U.S. Pat. Nos. 2,999,835; 3,028,365; 3,334,154 and 4,131,575.

These aromatic polycarbonates can be manufactured by known processes, such as, for example, by reacting a dihydric phenol with a carbonate precursor such as phosgene, a haloformate or a carbonate ester, in accordance with methods set forth in the above-cited literature and U.S. Pat. Nos. 4,018,750 and 4,123,436, or by transesterification processes such as disclosed in U.S. Pat. No. 3,153,008, as well as other processes known to those skilled in the art. All of the above-mentioned patents are incorporated herein by reference.

The polycarbonates so produced are typified as possessing recurring structural units of the formula:

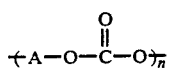

wherein A is a divalent aromatic radical remaining after removal of the hydroxyl groups from the dihydric phenol employed in the polymer producing reaction and n is greater than 1, preferably from about 10 to about 400. Preferred polycarbonate resins are of the formula:

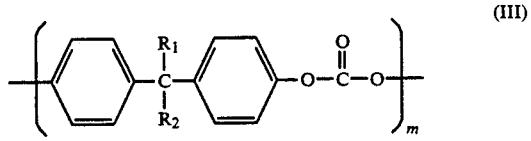

wherein $R_1$ and $R_2$ are independently hydrogen, (lower) alkyl or phenyl and m is at least 30 or preferably between 40 and 300. The term (lower) alkyl includes hydrocarbon groups of from 1 to 6 carbon atoms.

The aromatic polycarbonates utilized in the present invention also include the polymeric derivatives of a dihydric phenol, a dicarboxylic acid, and a carbonic acid such as disclosed in U.S. Pat. No. 3,169,121, incorporated herein by reference.

It is also possible to employ two or more different dihydric phenols.

Branched polycarbonates, such as are described in U.S. Pat. No. 4,001,184, can be utilized in the practice of this invention, as can blends of linear polycarbonate and a branched polycarbonate.

The filamentous glass to be employed in reinforcing agent (c) in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively sodium free. This is known as "E" glass. However, other glass compositions are useful. All such glasses are contemplated as within the scope of the present invention. The filaments are made by standard processes, e.g., by steam or air blowing, flame blowing and mechanical pulling. The preferred filaments for plastics reinforcement are made by mechanical pulling. The filament diameters preferably range from about 0.00012 to about 0.00075 inch, but this not critical to the present invention. It is known, however, to those skilled in the art, that smaller filament diameters will also increase the strength of plastics treated therewith.

The length of the glass filaments and whether or not they are bundled into fibers and the fibers bundled in turn to yarns, ropes or rovings, or woven into mats, and the like are also not critical to the invention. However, in preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur.

Essential to the present invention is that the glass fibers are treated with a sizing agent comprising an epoxy functional, preferably a di- or tri-epoxy functional cyanurate or isocyanurate.

The glass fiber coating may optionally contain other materials to improve bonding of the di- and tri-epoxy functional cyanurates and isocyanurates to the glass fiber. Functionalized silanes especially alkoxy silanes may be useful in this regard. Illustrative are aminopropyl triethoxy silane, glycidyl propyl trimethoxy silane, (3,4-epoxy cyclohexyl) ethyl triethoxy silane, mercaptopropyl silane, aminoethyl aminopropyl alkoxy silane and ureido-alkyl triethoxy silanes. Most preferred are aminopropyl triethoxy silane and glycidylpropyl triethoxy silane.

The isocyanurate and cyanurate functionalization are epoxy groups. For example, glycidyl, epoxy propyl and epoxy cyclohexyl. The most preferred sizing agent contains triglycidyl isocyanurate (TGIC). The sizing agent is preferably present at a level from 0.01 to 2.0 percent by weight based on the total weight of the glass fiber reinforcing agent.

The epoxy functionalized cyanurate or isocyanurate, the functionalized silane and the glass fiber are thought to chemically react during the coating and annealing process to give the modified glass fibers of the invention. However, the inventors do not wish to be bound by any theory.

The glass fiber coating may also contain film forming materials known to those skilled in the art, which will stick the individual fibers into bundles to facilitate the handling of the fibers and blending them with the resin prior to melt mixing. These film forming ingredients impart good glass strand integrity on the fibers, i.e. resistance to forming "fuzz balls". Examples of film forming additives are starches, epoxy resins, polyvinyl acetate, unsaturated polyesters, polyurethane, polyvinyl pyrollidone, phenoxy resins, polyvinyl ether copolymers and the like. The preferred film formers are soluble in water or form stable emulsions, do not cause unfavorable interactions with the resins of the blend are stable under melt processing conditions and give fibers with good integrity.

It is also contemplated herein that the glass fiber treated with sizing agent be annealed. Annealing may be carried out in a conventional annealing oven, as known to those skilled in the art, at temperatures preferably from about 200° F. to about 500° F. for from about 1 to 5 hours.

In general, the best properties will be obtained if the sized filamentous glass reinforcement agent is present from at least about 1% by weight, preferably from about 1% to about 60% by weight, and most preferably from about 25% to about 40% by weight based on the total weight of the composition.

The aromatic polycarbonate resin is preferably present in the composition at a level of from 5% to 90% by weight based on the total weight of the composition, more preferably from 10% to 90% by weight thereof, even more preferably from 10% to 50% by weight thereof; and most preferably about 30% to 40% by weight thereof. The aromatic polycarbonate resin may be present at a level of more than 50% by weight based on the total weight of the composition. The linear polyester resin is preferably present in the composition at a level of from 10% to 95% by weight based on the total weight of the composition, more preferably from 20% to 40% by weight thereof, and most preferably about 30% by weight thereof. The aromatic polycarbonate resin is a non-halogenated aromatic polycarbonate resin. The composition preferably contains more than 50% by weight polycarbonate based on the total weight of polycarbonate and polyester in the composition.

The compositions of the present invention can include, in addition to fibrous glass reinforcement of the type described, non-glass reinforced fibers in combination therewith, such as mineral reinforcing fillers, e.g. talc, clay, silica, calcium silicate, mica, and the like.

Other ingredients, such as dyes, pigments, stabilizers, rubbery impact modifiers, plasticizers, flame retardants, drip retardants and the like can be added for their conventionally employed purposes. Illustrative flame retardant additives are disclosed in U.S. Pat. Nos. 3,833,685; 3,341,154; 3,915,926 and 3,671,487. Other flame retardants are disclosed in U.S. Pat. Nos. 3,681,281; 3,557,053; 3,830,771 and United Kingdom Patent No. 1,358,080.

Generally speaking, the more important of the flame retardant compounds contain chemical elements employed for their ability to impart flame resistance, e.g., bromine, chlorine, antimony, phosphorous and nitrogen. It is preferred that the flame-retardant additive comprise a halogenated organic compound (brominated or chlorinated); a halogen-containing organic compound in admixture with a phosphorous compound or compounds containing phosphorous-nitrogen bonds or a mixture of two or more of the foregoing.

The amount of flame retardant additive used is not critical to the present invention, so long as it is present in a minor proportion based on said composition, major proportions will detract from physical properties, but at least sufficient to render the resin blend non-burning or self-extinguishing. Those skilled in the art are well aware that the amount will vary with the nature of the resin and with the efficiency of the additive. In general, however, the amount of additive will be from 0.5 to 50 parts by weight per 100 parts of resin.

The preferred halogen compounds for this invention are aromatic halogen compounds such as brominated phthalimides, brominated polystyrene, brominated aryl ethers, halogenated bisphenols, polycarbonate polymers of halogenated bisphenols, brominated biphenyl, brominated terphenyl, or a compound comprising two phenyl radicals separated by a divalent alkylene or oxygen group and having at least two chlorine or bromine atoms per phenyl nucleus, and mixtures of at least two of the foregoing. Especially preferred are brominated phthalimides and polycarbonate oligomers of brominated bisphenols, alone, or mixed with antimony oxide.

The compositions of the present invention may also comprise a drip retardant agent. These are described in U.S. Pat. No. 3,671,487. Generally, the drip retardant agent comprises a polytetrafluoroethylene resin, which is commercially available or can be prepared by known processes. They are white solids obtained by polymerization of the tetrafluoroethylene in aqueous media with free radical catalysts, e.g., sodium, potassium or ammonium peroxydisulfates at 100 to 1,000 psi and at 0° C. to 200° C. and preferably 200° C. to 100° C. See Brubaker, U.S. Pat. No. 2,393,967.

Various materials which are chemically substantially inert may be blended into the compositions prepared by the method of this invention. Such materials include fillers, reinforcing materials, flame retardants, pigments, dyes, stabilizers, anti-static agents and mold release agents. Also present may be other resinous materials, especially impact modifying polymers which are generally present in the amount of about 10% to 20% by weight of resinous components.

The impact modifiers that can be added to the instant compositions are well known in the art. Examples of these impact modifiers are polyacrylates, polyolefins, styrenic resins, rubbery dienic polymers, and organopolysiloxane-polycarbonate block copolymers.

The polyacrylates which may be employed as impact modifiers are rubbery homopolymers or copolymers. In general, the polyacrylates described in U.S. Pat. No. 3,581,659, which is incorporated herein by reference, can be used, especially those containing units derived from alkyl acrylates, particularly n-butyl acrylate. Acrylate containing copolymers wherein the other monomer is, for example, derived from a methacrylate are also employable, see for example, Japanese Kokai No. 68/81611, incorporated herein by reference. Preferably the acrylate resin will be in the form of a rubber-elastic graft copolymer having a glass transition temperature below about −20° C., as per U.S. Pat. No. 4,022,748, incorporated herein by reference. More particularly, the acrylate resin will comprise a multiple stage polymer having a rubbery first stage (core) and a thermoplastic hard final stage (shell), see U.S. Pat. No. 4,096,202, incorporated herein by reference.

Typical core-shell polymers have a core comprising at least one of alkyl acrylate, diene and styrene units and a shell comprising alkyl methacrylate units. They are often preferably multi-phase composite interpolymers comprised of a $C_1$–$C_5$ acrylate and a $C_1$–$C_5$ methacrylate. These interpolymers consist of about 25 to 95 weight percent of a first elastomeric phase polymerized from a monomer system comprising about 77 to 99.8 weight percent of a $C_1$–$C_5$ alkyl acrylate, 0.1 to 5 weight percent of crosslinking monomer, 0.1 to 5 weight percent of graftlinking monomer, and about 75 to 5 weight percent of a final rigid thermoplastic phase polymerized in the presence of said elastomeric phase.

The crosslinking monomer is polyethylenically unsaturated monomer having a plurality of addition polymerizable reactive groups which all polymerize at substantially the same rate of reaction. Suitable crosslinking monomers include the polyacrylic and polymethacrylic esters of polyols such as butylene diacrylate and dimethacrylate, trimethylol propane trimethacrylate, and the like; di- and trivinyl benzene, vinyl acrylate and methacrylate, and the like. Preferred crosslinking monomer is butylene diacrylate.

The graftlinking monomer is polyethylenically unsaturated monomer having a plurality of addition polymerizable reactive groups, at least one of which polymerizes at substantially different rates of polymerization from at least one other of said reactive groups. The function of the graftlinking monomer is to provide a residual level of unsaturation in the elastomeric phase, particularly in the latter stages of polymerization and, consequently, at or near the surface of the elastomer particles.

When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to the surface of the elastomer. Among the effective graftlinking monomers are the allyl group containing monomers of alkyl esters of ethylenically unsaturated acids such as allyl acrylate, allyl methacrylate, diallyl maleate, diallyl fumarate and allyl acid itaconate. Somewhat less preferred are the diallyl esters of polycarboxylic acids which do not contain polymerizable unsaturation. The preferred graft-linking monomers are allyl methacrylate and diallyl maleate.

A most preferred interpolymer has only two stages, the first stage comprising about 60 to about 95 weight percent of the interpolymer and being polymerized from a monomer system comprising 95% to 99.8% by weight butyl acrylate, 0.2 to 1.5 weight percent butylene diacrylate as crosslinking agent, 0.1% to 2.5% by weight allyl methacrylate or diallyl maleate as a grafting agent, with a final stage polymerized from about 60% to 100% by weight methyl methacrylate.

Another quite useful acrylate based resin impact modifier is an acrylate-styrene-acrylonitrile resin, the so-called ASA resin. Such resins are described in U.S. Pat. No. 3,944,631, incorporated herein by reference. Basically, this resin is comprised of from about 10 to about 50 weight percent of a crosslinked acrylate polymer having a Tg of less than 25° C., from about 5 to about 35 weight percent of a crosslinked styrene-acrylonitrile copolymer, and from about 15 to about 85 weight percent of a non-crosslinked or linear styrene-acrylonitrile copolymer. The composition is made by a three-step sequence comprising emulsion polymerizing of an alkyl (meth)acrylate containing at least one crosslinking monomer, emulsion polymerizing a monomer mixture of styrene, acrylonitrile and at least one crosslinking monomer in the presence of the crosslinked acrylate elastomer formed in the previous step, and finally emulsion polymerizing or suspension polymerizing of styrene and acrylonitrile in the presence of the previously formed product.

The acrylic elastomeric particles used in preparing these resins comprise crosslinked acrylic polymers or copolymers having a Tg of less than about 25° C. which can be polymerized by means of free radical initiated emulsion techniques. These acrylic elastomer particles are crosslinked so that they can retain their size and shape during subsequent polymer processing steps. This crosslinking is achieved during the polymerization of the elastomer by including a polyfunctional ethylenically unsaturated monomer in the polymerization reaction mixture.

Examples of acrylic elastomers that can be used include the crosslinked polymers of $C_2$–$C_{10}$ alkyl acrylate and $C_8$–$C_{22}$ alkyl methacrylate monomers, preferably the $C_4$–$C_8$ alkyl acrylates such as n-butyl acrylate, ethyl acrylate and 2-ethylhexyl acrylate. The most preferred acrylate is n-butyl acrylate. At least one acrylate monomer is used in this step. It is also possible to utilize mixtures of two or more different acrylate or methacrylate monomers, as well as mixtures of acrylate and methacrylate monomers. If desired, the monomer charge may optionally contain small amounts, i.e., 1–20% by weight of the amount of acrylate monomer, of such monomers as styrene, acrylonitrile, methacrylic acid, acrylic acid, vinylidene chloride, vinyltoluene and any other ethylenically unsaturated monomer copolymerizable with the (meth)acrylate monomer selected from use.

The polyolefins which can be employed as impact modifiers are the homopolymers and the copolymers. Preferred polyolefins are those which are derived from monomers containing from 2 to about 10 carbon atoms. Some illustrative non-limiting examples of these polyolefins include polyethylene, polypropylene, polybutylene, polyhexene, polyisobutylene and ethylenepropylene copolymer.

Methods for the preparation of the polyolefins are abundantly described in the literature and are well known to those skilled in the art. Polyethylene, for example, can be prepared by various procedures using cationic, anionic or free radical initiating catalysts, with conditions varied to produce a range of molecular weights and densities and various degrees of branching or non-branching. In one procedure, which involves free radical initiation, ethylene gas is polymerized in the presence of a peroxide initiating catalyst at a pressure between 15,000 and 40,000 psi and at a temperature between 100° C. and 200° C. to produce a relatively low density polymer, i.e., 0.90 to 0.94 gm/cm$^3$.

The polyethylene can also be prepared by low pressure processes effective to attain a polymer of higher molecular weight and a higher density. In one such procedure, known as the Phillips process, ethylene is contacted in an inert solvent slurry of a catalyst such as chromium oxide supported on silica-aluminum, at pressures of 400 to 500 psi and temperatures of 130° C. to 170° C., followed by extraction of the polymer with hot solvent and purification, to produce a polyethylene product having a density between 0.96 to 0.97 gm/cm$^3$.

Still other procedures are possible, such as emulsion polymerization in aqueous media in the presence of a peroxy compound, as well as suspension polymerization at low temperatures using a silver salt-peroxide redox system.

Also employable as an impact modifier is polypropylene, a common commercial form of which is isotactic polypropylene. Such polymers can be prepared by anionically initiated reactions using Ziegler type catalysts, e.g., titanium halide such as $TiCl_3$ in combination with an organometallic co-catalyst such as trialkyl aluminum halide. Polymerization proceeds readily at temperatures between 25° C. and 100° C. to yield a polymer in the form of a slurry of insoluble granular powder.

Copolymers of ethylene and propylene can be prepared using procedures similar to those for polyethylene and other polyolefins; for instance, by the polymerization reaction of a mixture of ethylene and propylene in the presence of a Ziegler type catalyst or by free radical initiation under high pressures.

Polymers based on still higher olefins are not as readily available and, therefore, not as preferred. Examples of such higher polyolefins are polymers based on 2-methyl-1-butene, 1-pentene, 4-methyl-1-pentene, and the like. They can be prepared by known procedures including those described in "Encyclopedia of Polymer Science and Technology", John Wiley & Sons, Inc., Vol. 9, pp. 440–460, 1965, incorporated herein by reference.

The linear low density polyolefins, such as linear low density polyethylene, may be prepared by state of the art polymerization processes such as those described in U.S. Pat. No. 4,076,698, incorporated herein by reference. The polymers may have a density between 0.89 and 0.96 gm/cc and a controlled concentration of simple side branching as opposed to random branching which distinguishes them from polymers such as high pressure low density polyethylene and high density polyethylene. The preferred range of density is from 0.915 to about 0.945 gm/cc. The linear low density polyethylenes are made from ethylene and alpha-olefins of 3 to 8 carbon atoms, e.g., butene-1, octene-1, etc., or mixtures thereof. The comonomer is generally used in minor amounts, e.g., 10 mole % or less of the total amount of monomers. A preferred range is about 1–3 mole %. A particularly useful copolymer is made from ethylene and butene such as, for example, ESCORENE LPX-15 marketed by Exxon Chemical Company.

Some particularly useful linear low density polyethylenes are those made from ethylene and a $C_4$–$C_7$ alpha-olefin as comonomer. Such linear low density polyethylenes, as well as their use as impact modifiers in polycarbonate resins, are described in U.S. Pat. No. 4,563,501, incorporated herein by reference.

Olefin-containing copolymers such as olefin acrylates and olefin diene terpolymers can also be used as impact modifiers in the present compositions. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. They are commercially available such as, for example, EPSYN 704 from Copolymer Rubber Company. They are more fully described in U.S. Pat. No. 4,559,388, incorporated herein by reference.

Various rubber polymers can also be employed as impact modifiers. Examples of such rubbery polymers are polybutadiene, polyisoprene, styrene-butadiene, and various other polymers or copolymers having a rubbery dienic monomer.

Styrene-containing polymers can also be employed as impact modifiers. Examples of such polymers are acrylonitrile-butadiene-styrene, styrene-acrylonitrile, acrylonitrile-butadiene-alpha-methylstyrene, methacrylate-butadiene-styrene, and other high impact styrene-containing polymers such as, for example, high impact polystyrene. Other known impact modifiers include various elastomeric materials such as organic silicone rubbers, elastomeric fluorohydrocarbons, elastomeric polyesters, the random block polysiloxane-polycarbonate copolymers, and the like. The preferred organopolysiloxane-polycarbonate block copolymers are the dimethylsiloxane-polycarbonate block copolymers.

Preferred impact modifiers are methacrylate butadiene styrene (MBS) resins, high rubber content acrylonitrile butadiene styrene (HRGABS) resins, acrylate, butylacrylate resins, and acrylonitrile, styrene butylacrylate (ASA) resins.

The compositions of the present invention can be prepared by a number of procedures. In one way, the reinforcing glass fibers (a glass roving or a bundle of strands of glass filaments) are treated with a sizing agent of the present invention, e.g., triglycidyl isocyanurate, to substantially coat the fibers and are chopped into small pieces, e.g., one-fourth to 2 inches in length. The treated chopped glass fibers, and optionally a mineral filler, are fed into an extrusion compounder with the resin blend, and optional nucleating agent or other additive, to produce molding pellets. The reinforcing agent is thereby shortened and dispersed in a matrix of the resin coming out less than one-sixteenth of an inch long in the process. In another procedure, glass filaments are ground or milled to short lengths, treated with triglycidyl isocyanurate, and are then mixed with the polycarbonate/polyester resin blend and optional nucleating agent by dry blending and then either fluxed on a mill and ground, or they are extruded and chopped. In still another procedure, continuous lengths of glass roving are pretreated with a triglycidyl isocyanurate sizing agent and then drawn through a bath of melted resin blend, flame retardant additive and nucleating agent which thereby substantially coats the filaments and the resin coated treated glass strand is chopped into small cylinders, one-fourth inch or longer, to form a molding compound. The treated glass fibers can also be mixed with resin and additives and directly molded, e.g., by injection or transfer molding techniques.

In addition, compounding should be carried out to ensure that the residence time in the machine is short, the temperature is carefully controlled, the friction heat is utilized; and an intimate blend between the resin and the reinforcement is obtained.

Although it is not essential, good results are obtained if the components are pre-compounded, pelletized and molded. Pre-compounding can be carried out in conventional equipment. For example, after carefully pre-drying the polycarbonate/polyester resin blend, e.g., under vacuum at 100° C. for about 12 hours, a single screw extruder is fed with a dry blend of the components, the screw employed having a long transition section to ensure proper melting preferably at 460° F. to 480° F. at 100 rpm on a 2.5 inch Prodex single screw extruder with a 30:1 L/D double wave screw. On the other hand, a twin extrusion machine, e.g. a 28 mm Werner Pfleiderer machine can be fed with resin and additives at the feed port and the triglycidyl isocyanurate treated glass fiber reinforcing agent downstream.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, and conventional mold temperatures.

Preferably the sizing agent is present at a level of from 0.01% to 2.0% by weight based on the total weight of the glass fiber reinforcing agent.

EXAMPLES

The following examples illustrate the present invention. They are not to be construed to limit the claims in any manner whatsoever. All compositional data are in weight percent unless otherwise indicated.

Examples of the invention E2, E4 and E6 were prepared by blending all ingredients together, with the glass fibers added last to facilitate handling. The blends were extruded on a 2.5 in. single screw extruder at 500°–530° F. at 100–110 rpm. The pelletized strands were dried and injection molded into standard parts for ASTM testing. Comparative examples C1, C3 and C5 were prepared similarly.

Tables A and B list descriptions of resins, glass fibers, additives and test methods.

TABLE A—ABBREVIATIONS

PBT = Poly(1,4,butylene terephthalate) resin. VALOX ® 295 resin from GE Plastics.

PC = An aromatic polycarbonate derived from bisphenol A and phosgene. LEXAN ® 121 resin from GE Plastics.

FA = A Bisphenol A epoxy sizing on G filament E glass.

FB = A Bisphenol A epoxy sizing on G filament E glass.

FC = TGIC, amino trialkoxysilane with film former as G filament E glass.

IM = A commercially available (from Rohm & Haas) stabilized core-shell polymer containing a poly(- butylacrylate) core and a poly(methylmethacrylate) shell.

ST = Stabilizes include hindered phenol and phosphite antioxidants.

TABLE B

TS = Tensile strength in Kpsi as measured by ASTM D638.

FS = Flexural strength in Kpsi as measured by ASTM D790.

BI = Biaxial impact strength in ft-lbs total energy as measured by ASTM D3763 using a 4×⅛in. disc.

SG = Specific gravity is measured in g/cc.

|  | \multicolumn{6}{c}{EXAMPLES} | | | | | |
|---|---|---|---|---|---|---|
|  | C1 | E2 | C3 | E4 | C5 | E6 |
| PBT | 38 | 38 | 40 | 40 | 27.00 | 27.00 |
| PC | 37 | 37 | 20 | 20 | 60.02 | 60.02 |
| FA | 25 | — | 25 | — | — | — |
| FB | — | — | — | — | 11.00 | — |
| FC | — | 25 | — | 25 | — | 11.00 |
| IM | — | — | 15 | 15 | — | — |
| ST | 0.1 | 0.1 | 0.55 | 0.55 | 1.98 | 1.98 |
| TS(KPSI) | 18.2 | 19.9 | 16.1 | 17.5 | 11.2 | 12.4 |
| FS(KPSI) | 27.2 | 28.8 | 23.1 | 25.3 | 18.4 | 20.3 |
| BI | 6.9 | 8.0 | 10.3 | 10.3 | — | — |
| FM | — | — | — | — | 495 | 613 |
| SG | 1.433 | 1.429 | 1.418 | 1.424 | 1.302 | 1.305 |

What is claimed is:

1. A thermoplastic resin composition comprising:
   (a) an aromatic polycarbonate resin present at a level of from 4% to 49% by weight based on the total weight of said composition;
   (b) a poly(1,4 butyleneterephthalate) resin present at a level of from 50% to 95% by weight based on the total weight of said composition; and
   (c) a glass fiber reinforcing agent treated with a sizing agent selected from the group consisting of diepoxy functional cyanurates, triepoxy functional cyanurates, diepoxy functional isocyanurates, and triepoxy functional isocyanurates.

2. A thermoplastic resin composition comprising:
   (a) an aromatic polycarbonate resin present at a level of from 4% to 49% by weight based on the total weight of said composition;
   (b) a poly(1,4 butyleneterephthalate) resin present at a level of from 50% to 95% by weight based on the total weight of said composition; and
   (c) a glass fiber reinforcing agent treated with a sizing agent selected from the group consisting of diepoxy functional cyanurates, triepoxy functional cyanurates, diepoxy functional isocyanurates, and triepoxy functional isocyanurates wherein said sizing agent is triglycidyl isocyanurate.

3. The composition of claim 2 wherein said glass fiber reinforcing agent is present at a level of from 1% to 50% by weight of the composition.

4. A thermoplastic resin composition comprising:
   (a) an non-halogenated aromatic polycarbonate resin present at a level of from 5% to 90% by weight based on the total weight of the composition;
   (b) a thermoplastic polyester resin present at a level of from 4% to 90% by weight based on the total weight of the composition; and
   (c) a glass fiber reinforcing agent treated with a sizing agent selected from the group consisting of diepoxy functional cyanurates, triepoxy functional cyanurates, diepoxy functional isocyanurates, and triepoxy functional isocyanurates.

5. A thermoplastic resin composition comprising:
   (a) a non-halogenated aromatic polycarbonate resin present at a level of from 5% to 90% by weight based on the total weight of said composition;
   (b) a crystalline polyester resin present at a level of from 10% to 95% by weight based on the total weight of said composition wherein said crystalline polyester resin consists of repeating units of the general formula

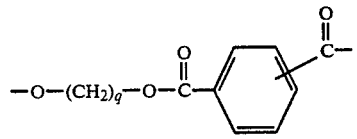

wherein g is a whole number of from 2 to 10; and
   (c) a glass fiber reinforcing agent treated with a sizing agent selected from the group consisting of epoxy functional cyanurates and epoxy functional isocyanurates wherein said sizing agent is triglycidyl isocryanurate.

6. A thermoplastic resin composition consisting essentially of:
   (a) a non-halogenated aromatic polycarbonate resin present at a level of from 5% to 90% by weight based on the total weight of said composition;
   (b) a crystalline polyester resin present at a level of from 5% to 95% by weight based on the total weight of said composition wherein said crystalline polyester resin consists of repeating units of the general formula

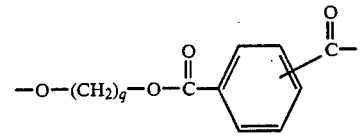

wherein g is a whole number of from 2 to 10; and
   (c) a glass fiber reinforcing agent treated with a sizing agent selected from the group consisting of epoxy functional cyanurates and epoxy functional isocyanurates wherein said sizing agent is triglycidyl isocyanurate.

* * * * *